(12) United States Patent
Coe

(10) Patent No.: US 12,391,816 B2
(45) Date of Patent: Aug. 19, 2025

(54) METHOD FOR PREPARING A RECYCLED RUBBER-BASED ELASTOMER

(71) Applicant: William B. Coe, Wrightwood, CA (US)

(72) Inventor: William B. Coe, Wrightwood, CA (US)

(*) Notice: Subject to any disclaimer, the term of this patent is extended or adjusted under 35 U.S.C. 154(b) by 535 days.

(21) Appl. No.: 17/758,460

(22) PCT Filed: Dec. 17, 2020

(86) PCT No.: PCT/US2020/065699
§ 371 (c)(1),
(2) Date: Jul. 6, 2022

(87) PCT Pub. No.: WO2021/141750
PCT Pub. Date: Jul. 15, 2021

(65) Prior Publication Data
US 2023/0066129 A1     Mar. 2, 2023

Related U.S. Application Data

(60) Provisional application No. 62/958,199, filed on Jan. 7, 2020.

(51) Int. Cl.
  *C08J 11/16*     (2006.01)
  *B29B 17/00*     (2006.01)
(52) U.S. Cl.
  CPC ........... *C08J 11/16* (2013.01); *B29B 17/0026* (2013.01); *C08J 2319/00* (2013.01)
(58) Field of Classification Search
  CPC .......... B29C 2043/568; B29K 2105/24; B29K 2105/243; B29K 2105/251; B29B 17/0026–0052; B29B 2017/0057–0094
  See application file for complete search history.

(56) References Cited

U.S. PATENT DOCUMENTS

| | | | | |
|---|---|---|---|---|
| 4,562,019 A | * | 12/1985 | Inoue | H01F 41/0273 264/72 |
| 5,762,967 A | * | 6/1998 | Sagawa | B30B 15/024 264/108 |
| 2010/0240800 A1 | | 9/2010 | Cunningham et al. | |
| 2011/0196102 A1 | | 8/2011 | Jacob et al. | |
| 2013/0237633 A1 | | 9/2013 | Tamir | |
| 2014/0045989 A1 | | 2/2014 | Wang et al. | |

FOREIGN PATENT DOCUMENTS

| | | | | | |
|---|---|---|---|---|---|
| CN | 101885868 A | * | 11/2010 | | |
| CN | 108359153 A | * | 8/2018 | | |
| EP | 1 435 372 | | 7/2004 | | |
| JP | 08181015 A | * | 7/1996 | ........... | H01F 1/0558 |
| WO | WO 18/200340 | | 11/2018 | | |
| WO | WO 19/028286 | | 2/2019 | | |
| WO | WO 19/135815 | | 7/2019 | | |

OTHER PUBLICATIONS

Machine Translation of CN108359153A. Aug. 3, 2018. (Year: 2018).*
Machine Translation of CN101885868A. Nov. 17, 2010. (Year: 2010).*
Machine Translation of JP08-181015A. Jul. 12, 1996. (Year: 1996).*
Anthony, 2006, Technology to separate rubber crumb from fiber, Applied Engineering in Agriculture, 22(4):563-570.
International Search Report and Written Opinion dated Apr. 7, 2021 in application No. PCT/US2020/065699.

* cited by examiner

*Primary Examiner* — Stephen E Rieth
(74) *Attorney, Agent, or Firm* — Knobbe, Martens, Olson & Bear, LLP

(57) ABSTRACT

Crumb rubber obtained from recycled tires is subjected to a process involving phase reticulation induced sulfidic metathesis. The process utilizes a reactive component that interferes with sulfur bonds, assisted by exposure to a pulsed magnetic field. The resulting rubber, subjected to interlinked substitution, exhibits properties similar to those of the virgin composite rubber structure prior to being granulated, or other polymeric materials, and is suitable for use in fabricating new tires, engineered rubber articles, and asphalt rubber for use in waterproofing and paving applications.

22 Claims, 2 Drawing Sheets

METHOD FOR PREPARING A RECYCLED RUBBER-BASED ELASTOMER

INCORPORATION BY REFERENCE

This application is the U.S. National Phase of International Application No. PCT/US2020/065699, filed Dec. 17, 2020, titled "METHOD FOR PREPARING A RECYCLED RUBBER-BASED ELASTOMER," which claims the benefit of U.S. Provisional Application Ser. No. 62/958,199, filed Jan. 7, 2020, titled "METHOD FOR PREPARING A RECYCLED RUBBER-BASED ELASTOMER." All of the above-referenced applications are incorporated by reference herein in their entirety.

FIELD OF THE INVENTION

Crumb rubber obtained from recycled tires is subjected to a process involving phase reticulation induced sulfidic metathesis. The process utilizes a reactive component that interferes with sulfur bonds, assisted by exposure to a pulsed magnetic field. The resulting rubber, subjected to interlinked substitution, exhibits properties similar to those of the virgin composite rubber structure prior to being granulated, or other polymeric materials, and is suitable for use in fabricating new tires, engineered rubber articles, and asphalt rubber for use in waterproofing and paving applications.

BACKGROUND OF THE INVENTION

In 2015, end-use markets consumed 87.9% percent by weight of the scrap tires generated in the U.S. The total volume of scrap tires consumed in end use markets in the U.S. reached approximately 3551 thousand tons of tires. RMA estimates that about 4038 thousand tons of tires were generated in the U.S. in 2015. Of those tires, 25.8% were used to produce ground rubber, 48.6% for tire derived fuel, 11.4% were land disposed, 7.0% were used in civil engineering, and 7.1% went to miscellaneous uses (0.7% to electric arc furnace, 1.3% to reclamation projects, 2.6% were exported, and 2.6% went to other uses). In 1990, only eleven percent of tires were consumed on a per tire basis. Positive end-use market results in 2015 were primarily the result of high rates of TDF use and lower exports. In the long term, the need to expand all economically viable and environmentally sound markets for scrap tires is still an imperative. Scrap tires were consumed by a variety of scrap tire markets, including tire-derived fuel, civil engineering and ground rubber applications. Other smaller markets and legal landfilling consumed the remaining annually-generated tires.

Key scrap tire markets include tire derived fuel, ground rubber, civil engineering and other markets. In tire derived fuel applications, scrap tires are used as a cleaner and more economical alternative to coal as fuel in cement kilns, pulp and paper mills and industrial and utility boilers. Ground rubber applications utilize approximately 1020 thousand tons of scrap tires, or over 25 percent of the volume of scrap tires generated each year. Ground rubber is produced by grinding scrap tires into size defined pieces. Ground rubber applications include new rubber products, playground and other sports surfacing and rubber-modified asphalt. Ground rubber also includes larger pieces of rubber used as landscaping mulch, and loose fill playground material. The playground and mulch market was the most dynamic segment in the ground rubber market during this period. The asphalt market uses ground rubber to modify the asphalt binder used in road paving, resulting in quieter, more durable roads. The civil engineering market consumes approximately 274 thousand tons of tires per year, about 7.7 percent of the total tires to market, and consists of tire shreds used in road and landfill construction, septic tank leach fields, alternative daily cover and other construction applications. Additional smaller markets for scrap tires exist that consume approximately 7% of annually generated scrap tires. These markets include tires consumed in electric arc furnaces (steel manufacturing), professionally engineered tire bales and products punched, pressed or stamped from scrap tires. Total tire rubber consumed in ground rubber markets is about 1.36 billion pounds. The total scrap tires diverted to these ground rubber markets is about 1.02 million tons (62 million tires). The percent of total pounds of ground rubber consumed in the market in 2015 is as follows: sport surfaces 25%, playground mulch 22%, molded/extruded products 35%, asphalt 15%, automotive uses 2%, and export 1%.

Stockpiles of scrap tires historically began to be created around the 1960s and 1970s when tires were diverted from landfills, but recycling markets for them were not functional. Stockpiles proved to be prone to catastrophic fires which created air and water pollution.

Worldwide rubber tire production is responsible for generating approximately 99% of worldwide, end-of-life (EOL) tire scrap. About 1.1 billion scrap tires are generated annually, corresponding to roughly 12 million tons of scrap tire. Due to the punishing physical properties required of a new tire, tires embody a carefully engineered weaving together of steel and fiber cords with a mineral and carbon-filled rubber blend, all cross linked to a highly tenacious structure. The EOL tire is challenging to breakdown to its original essential elements. The potentially highest value component—the rubber—is particularly difficult to reclaim, due to the vulcanization process it is subjected to. As a result EOL tires that are no longer suitable for use on vehicles due to wear or irreparable damage are typically either subject to pyrolysis (e.g., to generate energy for use in cement manufacturing), or ground up to be used as filler (e.g., in asphalt pavement, new tires, construction or landscaping materials).

SUMMARY OF THE INVENTION

While extensive research efforts over many years have been devoted to development of methods for devulcanizing vulcanized rubber, e.g., tire rubber, the first method for recovery or transformation of tire rubber into a commercially viable product having properties similar to virgin composite rubber was reported in PCT Publ. No. WO 2018/200340, PCT Publ. No. WO 2019/135815, and PCT Publ. No. WO 2019/028286. The present methods provide an improvement to this process, enabling the process to be conducted with substantially greater efficiency and much greater cost effectiveness.

An interlinked substitution method for extracting, utilizing, or transforming the natural or synthetic rubber in waste tires and other vulcanized rubber scrap offers potential as a low cost source for quality natural or synthetic rubber. Such reclaimed materials may exhibit properties similar to, or even superior to, those of the product from which they are derived. Rubber subjected to processes as described herein is variously referred to herein as "treated rubber", "activated rubber", "interlinked substituted rubber", "PTR rubber", "post reactor ground tire rubber", "EOL tire rubber crumb-derived rubber" or the like.

One of the objects of the methods described herein is to process, with greater efficiency, vulcanized rubber products or other cross linked rubber containing products, e.g., as found in end-of-life (EOL) rubber tires, into a form suitable for use as a raw material in the fabrication of articles of manufacture that would conventionally be fabricated from virgin rubber subjected to vulcanization, e.g., new tires or other vulcanized rubber products. The vulcanized rubber subjected to the methods described herein is typically provided as a conventionally available, 30 mesh, end-of-life, ground tire rubber particle (GTRP). It is subjected to a method whereby it is transformed into a crosslink re-aligned, 5-10 micron moiety, wherein the micro-moiety may be re-fabricated into a monolithic, macro-structure characterized by an interpenetrating elastomer network exhibiting physical properties substantially analogous to the macro-structural properties of the original, EOL tire rubber prior to being size-reduced to the 30 mesh particle.

The Joint Research Council (JRC) for the EC recently published a Critical Raw Material (CRM) study in December 2017 listing 27 materials subject to supply disruption; a disruption that would result in significant loss of economic sustainability. Natural rubber (NR) was listed as one of the 27 materials. The process disclosed herein can provide up to 70% of the natural rubber gap referred to in the CRM study.

In a first aspect, a method is provided for preparing a recycled rubber-based elastomer, comprising: applying compression to a mixture comprising vulcanized rubber particles and an organometallic compound, where the mixture subject to compression is exposed to a pulsed magnetic field, whereby a recycled rubber-based elastomer is obtained.

In an embodiment of the first aspect, the pulsed magnetic field has a wavelength in a range of from 300 MHz to 300 GHz, optionally from 500 MHz to 30 GHz, optionally from 700 MHz to 3 GHz, optionally from 800 MHz to 1 GHz, and optionally 900 MHz.

In an embodiment of the first aspect, the mixture is subject to compression in a pinch roller while being exposed to the pulsed magnetic field.

In an embodiment of the first aspect, the organometallic compound comprises a metal having octahedral molecular geometry.

In an embodiment of the first aspect, the organometallic compound comprises a metal ion selected from the group consisting of $Co^{2+}$, $Cu^{2+}$, $Ni^{2+}$, $Zn^{2+}$, and $Mn^{2+}$.

In an embodiment of the first aspect, the organometallic compound comprises an organic anion as a ligand to the metal ion.

In an embodiment of the first aspect, the organic anion comprises acetate ion.

In an embodiment of the first aspect, the organometallic compound is copper acetate.

In an embodiment of the first aspect, the organometallic compound is a metal salt that undergoes a phase change from solid to liquid or vapor in a range of 100-150° C.

In an embodiment of the first aspect, the vulcanized rubber crumbs have a particle size greater than 200 mesh.

In an embodiment of the first aspect, the organometallic compound is employed at a concentration of from 0.1% to 3% by weight of the mixture.

In an embodiment of the first aspect, the organometallic compound is employed at a concentration of from 0.1% to 2% by weight of the mixture.

In an embodiment of the first aspect, the organometallic compound is employed at a concentration of from 0.1% to 0.5% by weight of the mixture.

In an embodiment of the first aspect, the organometallic compound is employed at a concentration of 0.5% by weight of the mixture.

In an embodiment of the first aspect, the organometallic compound is employed in aqueous form.

In an embodiment of the first aspect, the organometallic compound is employed in a form of an aqueous mixture, wherein the aqueous mixture has a concentration of organometallic compound of from 5.5 to 7.5% by weight.

In an embodiment of the first aspect, the organometallic compound is employed in a form of an aqueous mixture, wherein the aqueous mixture has a concentration of organometallic compound of 6.5% by weight.

In an embodiment of the first aspect, the organometallic compound is dry coated on the vulcanized rubber particles.

In an embodiment of the first aspect, the mixture passes between the pinch rollers from 3 to 100 times.

In an embodiment of the first aspect, the mixture passes between the pinch rollers from 3 to 10 times.

In an embodiment of the first aspect, the mixture passes between the pinch rollers from 3 to 5 times.

In an embodiment of the first aspect, the mixture further comprises one or more of a virgin rubber or a virgin elastomer or a synthetic rubber.

In a second aspect, a reactor is provided comprising: a pair of cooperating pinch rollers; and at least one electromagnet configured to expose a mixture of an organometallic compound and ground tire rubber particles to a pulsed magnetic field as they pass between the pair of cooperating pinch rollers.

In an embodiment of the second aspect, the pinch rollers have a nip of ⅓₀₀₀ inch to ¼ inch.

In an embodiment of the second aspect, the mixture is subjected to a pressure of 10,000 psi to 30,000 psi.

In an embodiment of the second aspect, the mixture is exposed to 10 to 1000 magnetic pulses per second.

In an embodiment of the second aspect, the mixture is exposed to 10 to 100 magnetic pulses per second.

In an embodiment of the second aspect, the electromagnet is a horseshoe magnet.

In an embodiment of the second aspect, the electromagnet is incorporated into a pinch roller.

In an embodiment of the second aspect, the electromagnet is a bar incorporated into a pinch roller.

In an embodiment of the second aspect, each of the two pinch rollers comprises an electromagnet.

In an embodiment of the second aspect, the pinch roller is fabricated from a paramagnetic material.

In an embodiment of the second aspect, the pinch roller is fabricated from steel.

In a third aspect, a method is provided for preparing a rubber-based elastomer, comprising: applying compression to a mixture comprising virgin rubber, carbon black, and an organometallic compound, where the mixture subject to compression is exposed to a pulsed magnetic field, whereby a rubber-based elastomer is obtained.

In an embodiment of the third aspect, the pulsed magnetic field has a wavelength in a range of from 300 MHz to 300 GHz, optionally from 500 MHz to 30 GHz, optionally from 700 MHz to 3 GHz, optionally from 800 MHz to 1 GHz, and optionally 900 MHz.

In an embodiment of the third aspect, the mixture is subject to compression in a pinch roller while being exposed to the pulsed magnetic field.

In an embodiment of the third aspect, the organometallic compound comprises a metal having octahedral molecular geometry.

In an embodiment of the third aspect, the organometallic compound comprises a metal ion selected from the group consisting of $Co^{2+}$, $Cu^{2+}$, $Ni^{2+}$, $Zn^{2+}$, and $Mn^{2+}$.

In an embodiment of the third aspect, the organometallic compound comprises an organic anion as a ligand to the metal ion.

In an embodiment of the third aspect, the organic anion comprises acetate ion.

In an embodiment of the third aspect, the organometallic compound is copper acetate.

In an embodiment of the third aspect, the organometallic compound is a metal salt that undergoes a phase change from solid to liquid or vapor in a range of 100-150° C.

In an embodiment of the third aspect, the rubber is in a form of particles having a particle size greater than 200 mesh.

In an embodiment of the third aspect, the organometallic compound is employed at a concentration of from 0.1% to 3% by weight of the mixture.

In an embodiment of the third aspect, the organometallic compound is employed at a concentration of from 0.1% to 2% by weight of the mixture.

In an embodiment of the third aspect, the organometallic compound is employed at a concentration of from 0.1% to 0.5% by weight of the mixture.

In an embodiment of the third aspect, the organometallic compound is employed at a concentration of 0.5% by weight of the mixture.

In an embodiment of the third aspect, the organometallic compound is employed in aqueous form.

In an embodiment of the third aspect, the organometallic compound is employed in a form of an aqueous mixture, wherein the aqueous mixture has a concentration of organometallic compound of from 5.5 to 7.5% by weight.

In an embodiment of the third aspect, the organometallic compound is employed in a form of an aqueous mixture, wherein the aqueous mixture has a concentration of organometallic compound of 6.5% by weight.

In an embodiment of the third aspect, the organometallic compound is dry coated on particles of the rubber.

In an embodiment of the third aspect, the mixture passes between the pinch rollers from 3 to 100 times.

In an embodiment of the third aspect, the mixture passes between the pinch rollers from 3 to 10 times.

In an embodiment of the third aspect, the mixture passes between the pinch rollers from 3 to 5 times.

In an embodiment of the third aspect, the mixture is subjected to a pressure of 10,000 psi to 30,000 psi.

In an embodiment of the third aspect, the mixture is exposed to 10 to 1000 magnetic pulses per second.

In an embodiment of the third aspect, the mixture is exposed to 10 to 100 magnetic pulses per second.

In an embodiment of the third aspect, the mixture further comprises one or more of a end-of-life tire rubber or a carbon black containing rubber or another virgin elastomer or a synthetic rubber.

In a fourth embodiment, a reactor is provided for producing a rubber-based elastomer, comprising: a pair of cooperating pinch rollers; and at least one electromagnet configured to expose a mixture of an organometallic compound, rubber, and carbon black to a pulsed magnetic field as it passes between the pair of cooperating pinch rollers.

In an embodiment of the fourth aspect, the pinch rollers have a nip of 1/3000 inch to 1/4 inch.

In an embodiment of the fourth aspect, the reactor is adapted to subject the mixture to a pressure of 10,000 psi to 30,000 psi.

In an embodiment of the fourth aspect, the reactor is adapted to expose the mixture to 10 to 1000 magnetic pulses per second.

In an embodiment of the fourth aspect, the reactor is adapted to expose the mixture to 10 to 100 magnetic pulses per second.

In an embodiment of the fourth aspect, the electromagnet is a horseshoe magnet.

In an embodiment of the fourth aspect, the electromagnet is incorporated into a pinch roller.

In an embodiment of the fourth aspect, the electromagnet is a bar incorporated into a pinch roller.

In an embodiment of the fourth aspect, each of the two pinch rollers comprises an electromagnet.

In an embodiment of the fourth aspect, the reactor further comprises a belt adapted to transport the mixture to the pinch rollers, wherein the at least one electromagnet is situated adjacent to the belt.

In an embodiment of the fourth aspect, the reactor further comprises two electromagnets adapted to cooperatively generate an oscillating magnetic field.

In an embodiment of the fourth aspect, the pinch roller is fabricated from a paramagnetic material.

Each embodiment is independently combinable, in whole or in part, with one or more other embodiment(s) or aspect(s). Likewise, each aspect is independently combinable, in whole or in part, with one or more other embodiment(s) or aspect(s).

DETAILED DESCRIPTION OF THE EMBODIMENTS

Figure 1:
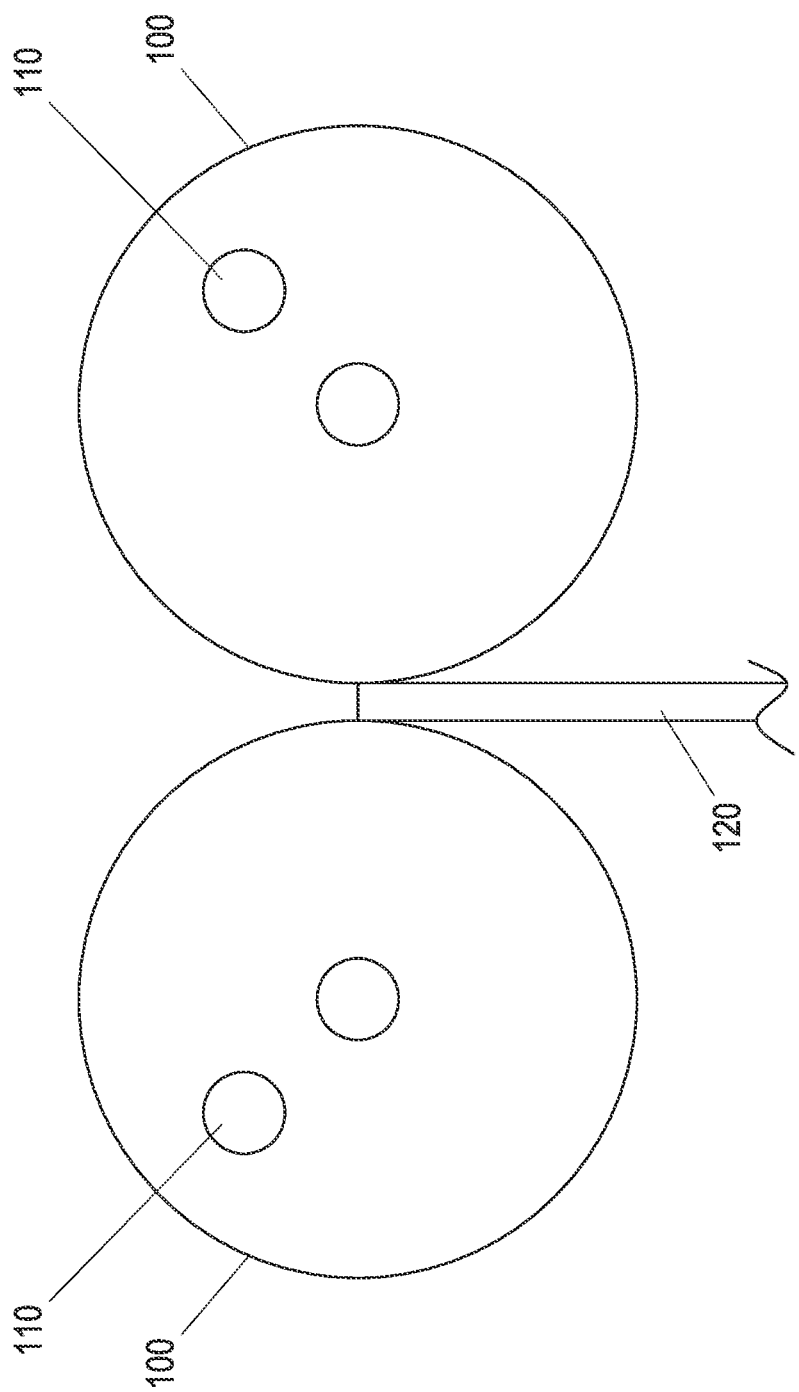
FIG. 1 is a diagram depicting a cross section of a pair of pinch rollers 100 incorporating an electromagnet 110 in a form of a rod. The mixture 120 of organometallic compound and vulcanized rubber particles passes through the nip of the pinch rollers.
Figure 2:
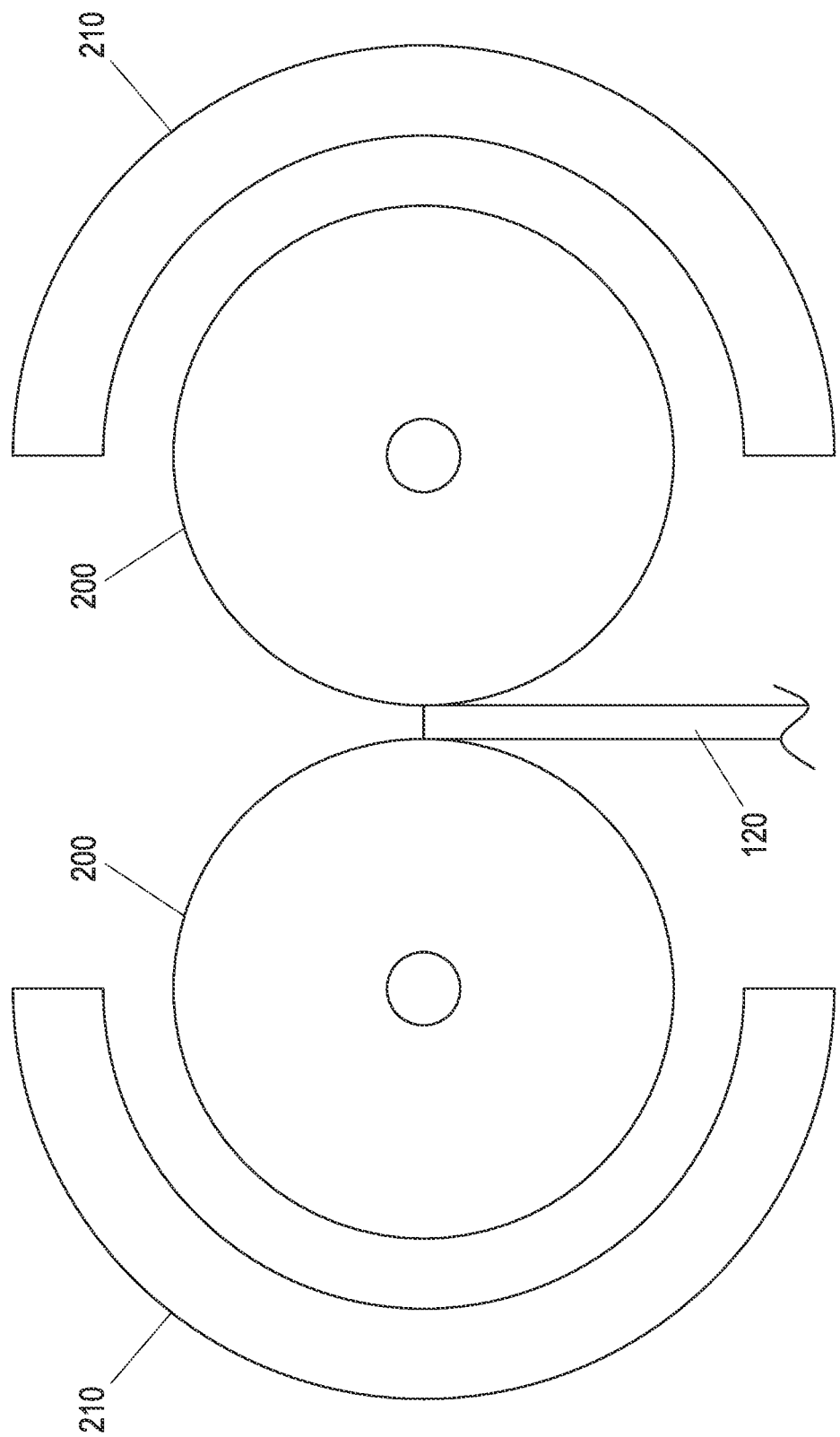
FIG. 2 is a diagram depicting a cross section of a pair of pinch rollers 200 with a pair of external electromagnets 210. The mixture 120 of organometallic compound and vulcanized rubber particles passes through the nip of the pinch rollers.

The following description and examples illustrate an embodiment of the present invention in detail. Those of skill in the art will recognize that there are numerous variations and modifications of this invention that are encompassed by its scope. Accordingly, the description of an embodiment should not be deemed to limit the scope of the present invention.

Introduction

An ambient, end of life (EOL), ground tire rubber (GTR) particle in the size range of approx. 600 microns (30 mesh), has a cross section composed of either the old tire tread or the tire side wall or a combination of the two. It may be generally characterized as a heterogeneous matrix of an interpenetrating, cross linked, elastomer network filled with inorganic substances, primarily carbon. Depending upon whether it is primarily tire tread or sidewall in origin the primary entangled elastomers will be natural rubber (NR) or styrene butadiene/butadiene rubber (BR S-BR), with the BR and S-BR typically having the larger mass component in the tread for better wear and the sidewall having an NR bias for improved flexural qualities. The crosslink may generally be described as elemental sulfur and/or a complex compound incorporating sulfur as its principal element, e.g., a polysulfidic chemical.

During tire construction the interpenetrating elastomer networks are formed using a sequential crosslink of the predominant elastomer (NR or S-BR) followed by the crosslink of the secondary elastomer, such that the secondary elastomer is "bent" to conform to the already vulcanized, higher strength primary elastomer. This technique imparts mechanical characteristics that are retained in the individual GTR particle.

A single vehicle tire, after being stripped of steel and fiber reinforcement will yield approximately sixteen pounds (16 lbs) of reusable GTR, with truck tires yielding more. Over one billion EOL tires are generated worldwide annually. About 50% are consumed as low value fuel. Where possible, maximizing the reuse of this raw material for its proven mechanical properties represents a substantial challenge, but, to the extent achieved, a resource recovery value of as much as 200:1 is observed when comparing its possible re-use in new tire construction to being consumed in a furnace for its BTU content.

Notably, recent detailed studies of the environmental advantages such a reversal of EOL-GTR usage, maximized, predicts that atmospheric carbon contribution might be reduced by the equivalent of shutting down 14 coal fired power plants (300,000 rail cars of coal) or removing six million vehicles from the roads or planting an additional 62 million acres of forests (equivalent to an area the size of the state of Arizona) for carbon sequestration. Accordingly, one object of the methods and compositions discussed herein is to prepare the GTR particle so that it may be recombined with similar particles or materials into a monolithic unit which may be integrated into the full spectrum of industrial rubber goods manufactured worldwide.

A method is provided that allows one to achieve the objective of preparing, augmenting, and then recombining the GTR particle(s) in such a manner that the individual, complex, heterogeneous, cross linked moieties are built into a re-entangled, monolithic structure, substantially composed of the original GTR; with uniform mechanical properties which are at least equivalent to the whole tire properties of the rubber matrix prior to the granulation process. Achievement of this objective is demonstrated by the end product being competitively re-introduced as feedstock for new tire and industrial rubber production.

The macro-characteristics of a ground tire rubber particle may be viewed from the perspective that it is a bit like an egg that has been scrambled, and therefore it cannot ever be un-scrambled. Similarly, it can be viewed as like an old car that has been crushed at a recycling yard, such that it can never be un-bent to its original specification. To some degree both these metaphors have merit. However, upon a closer examination a list of unusual mechanical qualities and conditions becomes apparent, which, if exploited, provide an opportunity to recover this complex resource in a commercially and technically viable way; whereby complete resource recovery emerges.

In GTR, the qualities and conditions of opportunity include the following. A substantial inventory exists of un-bound, eight sided sulfur rings. Previous accelerator chemistry byproducts have been degraded such that they may be mitigated so as not to interfere with further cross-linking processes. Existing crosslink density and sulfur bond length can be accurately assessed by chemical probe. A substantial, recoverable, ineffective elasticity exists within the interpenetrating density due to loop crosslinks within a single molecular backbone. The original, new tire morphology has undergone rigorous physical challenges causing the remaining structure to be annealed. A very high particle surface shoreline is presented as a result of the ambient grinding process. Substantial un-used allylic hydrogen and carbon sites remain in the entangled polymer structure(s). Classic, transverse sulfur bridge formation is well verified, providing a focused mechanistic model to approach resource recovery.

The strategic effort, using these qualities and conditions, is to 1) gently unpack the dense GTR composite structure, 2) dislocate the least stable attachment point of the transverse crosslink without negatively altering the elastomer molecule or the sulfur bridge, 3) install a complimentary virgin polymer receptor upon a dislocation site, then 4) following subparticle mechanically induced leafing, re-crosslink the original hinged, sulfur bridge at susceptible, dislocation sites along the elastomer backbone.

Unassisted, elemental sulfur will slowly crosslink functional rubber polymers, but the process is too slow and has too many end property difficulties to be a commercially realistic alternative to a commercially successful vulcanization. Vulcanization as discussed herein regards an accelerated sulfur vulcanization process as is practiced in commercial vulcanization.

Sulfur vulcanization was discovered by Charles Goodyear in 1839. After 178 years of development, it is universally agreed that the processes are complex which result in the formation of the transverse sulfuric bridge between adjacent, interpenetrating rubber polymers. These bridges in turn yield mechanical properties in an elastomeric material which are critical to civilization. However, much progress has been made and many, definitive elements of the progression are well established.

While a free-radical mechanism had long been assumed to be the controlling phenomena, more recently, with the advent of more advanced methods of discreet process characterization, a convincing presence has not been detected of the primary, theoretical radicals necessary to validate that mechanism. In contrast, an ionic mechanism has been predicted and validated using similar advanced process characterization methods. Since the modern vulcanization process involves many chemical components being mixed together at the start of the process, each (combination) with its own chemical reaction pathway, it is likely that both radical and ionic mechanisms are active but analysis reveals that the ionic mechanism is predominant.

A typical example (by wt. %) of an NR-BR tire compound is: NR 80%, BR 20%, ZnO 5%, steric acid 2%, silica-talc 3%, carbon black 55%, aromatic oil 10%, elemental sulfur 1.7%, N-Cyclohexyl-2-benzothiazole sulfenamide (CBS—an accelerator) 1.2%, 2-(4-Morpholinothio)-benzothiazole (MBS—an accelerator) 1.1%, and N-tert-butyl-2-benzothiazole sulfenamide (TBBS—an accelerator) 1.1%.

The process begins in a heated mold, after the tire recipe components have been thoroughly distributed and dispersed. The vulcanization process may be seen in three sequential events: 1) formation of the accelerator complex chemistry, 2) formation of the crosslink precursor, and 3) completion of the crosslink.

Conventional Usage of Scrap Rubber in Tire

Excluding the rubber trimmings generated prior to the final heating and cross linking of new tires, it is estimated that less than 0.0004% by weight of all EOL tires are reincorporated into a new tire master batch. Such reincorporation has been successfully accomplished at master batch loadings of up to 3% by weight utilizing very fine, cryogenically processed ground rubber obtained from EOL tires. A loading of EOL tire-derived processed ground rubber greater than this has thus far not been feasible, in that the physical properties required of new tire applications are not met at higher loading levels. Tire production typically begins with a base formula of components, with the base formula developed by selection of raw material(s). This is then reduced to a master batch in high shear mixing equipment. Typically, the master batch is done in two phases: the master pass and the finish pass. The master pass combines various rubber species which are introduced as small bales or sheets and are blended with fine powders of carbon black and minerals, as well as a small quantity of process oil(s). This step is performed at the high temperature required to lower the viscosity of the rubber elements such that the flow-resistant powder elements can be uniformly distributed in sufficiently small clusters or packets. These clusters or packets can then be subsequently dispersed to a minimal particle size. The finish pass is done at a lower temperature and usually under process conditions that create more of a smearing action of the heterogeneous elements. In the finish pass, rubber polymers are not further degraded by high temperatures as in the master pass, and the uniformly distributed agglomerates of powder components are worked into such small physical size that they become dispersed within the free molecular space of the rubber elements. Once the finish pass is completed, the master batch bales are ejected from the mixer and rolled into thin sheets (referred to as milling). The milled sheets are used to lay up, on specialized forming equipment, the tire carcass prior to being placed in a compression molding press for final crosslinking by thermal and/or chemical means.

Crosslinking accelerants include mercapto group or sulfur-based (e.g., elemental sulfur and/or, accelerator derivatives of N-tert-butyl-2-benzothizolesulfenamide (TBBS)). The sulfur-based crosslinking agents which react with sites in the master batch at or above a prescribed temperature may be partially introduced at both the master pass and the finish pass phase. The crosslinking during the final heating of the tire carcass causes the reactive sites in the various rubber elements to build a sufficient crosslink density to achieve the final physical properties required to meet the sustained load and heat environment to which the tire will be subjected.

The present methods for targeting the crosslink precursor site enables interlinked substitution of EOL tire, such that a functionally re-aligned, re-cross linkable, submicron particle rubber can be obtained. This rubber is suitable for reintroduction into new tire production at levels of up to 100% by weight of subsequent new tire master batch production. The new tires, utilizing such EOL tire-modified feedstock, exhibit performance qualities equivalent or similar to those achieved when all virgin materials are utilized.

Rubber from End-of-Life Tire Scrap

Rubber-containing crumb is manufactured from two primary feedstocks: tire buffings, a byproduct of tire retreading, whole tire, and scrap tire rubber. Scrap tire rubber comes from three types of tires: passenger car tires; truck tires; and off-the-road tires. End product yields for each of these tire types are affected by the tire's construction, strength and weight. On average, 10 to 16 pounds of end-of-life tire crumb can be derived from one passenger tire. Other sources of rubber-containing crumb includes products containing or made using recycled rubber-containing crumb, e.g., new rubber products, playground surfacing, rubber mulch, drainage aggregate, construction fill material, scraps from manufacturing, and the like.

Tires are composite structures containing a number of components. The tire carcass is composed of the tread, bead, sidewall, shoulder, and ply. Tires are formed from components such as natural and/or synthetic rubber, cords, and filler. The polymer most commonly employed for the tread and encasement of the cords is a blend of NR and S-BR copolymer. Cords form the ply and bead of the tire, and provide tensile strength necessary to contain the inflation pressure. Cords can comprise steel, natural fibers such as cotton or silk, and synthetic fibers such as nylon or Kevlar. Fillers can include silica and carbon black. A representative tire can comprise one or more of: synthetic rubber, natural rubber, sulfur and sulfur-containing compounds, silica, phenolic resin, oil (aromatic, naphthenic, and/or paraffinic), fabric (polyester, nylon, etc.), petroleum waxes, pigments (zinc oxide, titanium dioxide, etc.), carbon black, fatty acids, miscellaneous inert materials, and steel wire.

The typical passenger tire comprises 14% natural rubber, 27% synthetic rubber, 28% carbon black, 14-15% steel, and 16-17% fabric, fillers, accelerators, antiozonants, and other miscellaneous components. The average weight of a new passenger car tire is 25 lbs., and for a scrap passenger tire 22 lbs. Truck tires typically contain 27% natural rubber, 14% synthetic rubber, 28% carbon black, 14-15% steel, and 16-17% fabric, fillers, accelerators, antiozonants, and other miscellaneous components. The average weight of a new truck tire is 120 lbs., and for a scrap truck tire 110 lbs. Other types of tires can contain higher amounts of synthetic and/or natural rubber, e.g., 70% (by weight) rubber, 15% steel, 3% fiber, and 12% of other materials such as inert fillers. Rubber is found in tire components including tread, innerliner, beads, belts, and the like. The percent rubber by weight in a new passenger tire is typically as follows: 32.6% in tread; 1.7% in base, 21.9% in sidewall, 5.0% in bead apex, 1.2% in bead insulation, 11.8% in fabric insulation; 9.5% in insulation of steel cord, 12.4% in innerliner, and 3.9% in undercushion.

The rubber compounds employed in a typical tire, along with associated materials, are set forth in Table 1. The methods described herein are suitable for processing tire tread, base, sidewall, as well as innerliner, and are also suitable for processing other materials containing vulcanized (or otherwise cross linked) natural rubber, styrene-butadiene rubber, and isobutylene-isoprene rubber. As further described herein, the other components, e.g., carbon black, present in EOL tire or other vulcanized-rubber containing articles of manufacture may in some embodiments remain in the rubber subjected to the processes described herein, with no processing conducted to impact the properties or amounts of the other component(s). In other embodiments, the rubber may be subjected to further processes to enrich or minimize these additional components, or change their properties.

TABLE 1

|  | Tread (PHR) | Base (PHR) | Sidewall (PHR) | Innerliner (PHR) |
| --- | --- | --- | --- | --- |
| Natural Rubber | 50.0 | 100.0 | 75.0 |  |
| Styrene-Butadiene Rubber | 50.0 |  | 25.0 |  |
| Isobutylene-Isoprene Rubber |  |  |  | 100.0 |
| Carbon Black (Grade N110) | 50.0 | 15.0 | 20.0 |  |
| Carbon Black (Grade N330) |  | 25.0 | 35.0 |  |
| Carbon Black (Grade N765) |  |  |  | 50.0 |
| Processing Oil | 7.5 | 5.0 | 5.0 | 3.0 |
| Antioxidant | 1.0 | 0.75 | 1.0 | 1.0 |
| Antioxidant Wax |  |  | 2.0 |  |

TABLE 1-continued

|  | Tread (PHR) | Base (PHR) | Sidewall (PHR) | Innerliner (PHR) |
| --- | --- | --- | --- | --- |
| Stearic Acid | 2.0 | 4.0 | 3.0 | 1.5 |
| Zinc Oxidant | 5.0 | 5.0 | 5.0 | 5.0 |
| Accelerator (High) |  | 1.0 | 0.7 |  |
| Accelerator (Middle) | 1.25 |  |  | 0.4 |
| Accelerator (Low) |  |  |  | 0.4 |
| Sulfur | 2.5 | 3.0 | 2.8 | 2.0 |

*PHR = Per Hundred Rubber, parts on a weight basis
*Carbon grade = ASTM grading: Particle size and structure of carbon are different.

There are approximately 2.5 pounds of steel belts and bead wire in a passenger car tire. This material is made from high carbon steel with a nominal tensile strength of 2750 $MN/m^2$. The steel tire cord composition of a typical tire is set forth in Table 2.

TABLE 2

|  | Steel Belts | Bead Wire |
| --- | --- | --- |
| Carbon | 0.67-0.73% | 0.60% min. |
| Manganese | 0.40-0.70% | 0.40-0.70% |
| Silicon | 0.15-0.03% | 0.15-0.30% |
| Phosphorus | 0.03% max. | 0.04% max. |
| Sulfur | 0.03% max. | 0.04% max. |
| Copper | Trace | Trace |
| Chromium | Trace | Trace |
| Nickel | Trace | Trace |
| Coating | 66% Copper | 98% Brass |
|  | 34% Zinc | 2% Tin |

Whole tires can be ground to yield rubber particles mixed with other components of the tire. Methods for producing rubber containing particles from tires are known in the art. The used tires (or shreds or granules thereof) can be subjected to an optional cleaning step (e.g., a water wash). Tires can be recycled by subjecting them to an initial shredding step, then subjecting the shreds to a granulation process to yield an initial granulate having dimensions of 1-3 cm. Grinding can be conducted under ambient conditions (e.g., in a granulator or a cracker mill) or cryogenic conditions.

Ambient grinding is a multi-step processing technology that uses a series of machines (usually three) to separate the rubber, metal, and fabric components of the tire. Whether using granulation equipment or cracker mills, the first processing step typically reduces the original feedstock to small chips. The second machine in the series will grind the chips to separate the rubber from the metal and fabric. Then a finishing mill will grind the material to the required product specification. After each processing step, the material is classified by sifting screens that return oversize pieces to the granulator or mill for further processing. Magnets are used throughout the processing stages to remove wire and other metal contaminants.

In the final stage, fabric is removed by air separators. Rubber particles produced in the granulation process generally have a cut surface shape and rough texture, with similar dimensions on the cut edges.

Cracker mills use two large rotating rollers with serrations cut in one or both of them. The roll configurations are what make them different. These rollers operate face-to-face in close tolerance at different speeds. Product size is controlled by the clearance between the rollers. Cracker mills are low speed machines operating at about 30-50 RPM. The rubber usually passes through two to three mills to achieve various particle size reductions and further liberate the steel and fiber components. These mills do not have screens built into the mill and as such the mill itself does not control the final particle. A stand-alone screening system will separate "sized" particles from oversize granules following the mill and re-circulate the oversize products. The particles produced by the cracker mill are typically long and narrow in shape and have a high surface area.

Cryogenic processing uses liquid nitrogen or other materials/methods to freeze tire chips or rubber particles prior to size reduction. Most rubber becomes embrittled or "glass-like" at temperatures below −80° C. The use of cryogenic temperatures can be applied at any stage of size reduction of scrap tires. Typically, the size of the feed material is a nominal 2 inch chip or smaller. The material can be cooled in a tunnel style chamber, immersed in a "bath" of liquid nitrogen, or sprayed with liquid nitrogen to reduce the temperature of the rubber or tire chip. The cooled rubber is size-reduced in an impact type reduction unit, centrifuge, or hammer mill. This process reduces the rubber to particles ranging from ¼ inch minus to 30 mesh, with the majority of the particle distribution between ¼ inch minus and 20 mesh. A typical throughput is 4,000 to 6,000 pounds per hour. Cryogenic grinding avoids heat degradation of the rubber and produces a high yield of product that is free of almost all fiber or steel, which is liberated during the process.

Wet grinding, is a processing technology used to manufacture particles that are 40 mesh and finer. The wet grind process mixes partially refined crumb rubber particles with water creating a slurry. This slurry is then conveyed through size reduction and classification equipment. When the desired size is achieved, the slurry is conveyed to equipment for removing the majority of the water and then drying. Aside from the use of water, the same basic principles that are used in an ambient process are utilized in a wet grinding process. The major advantage for a wet grind process is the ability to create fine mesh crumb rubber. While products as coarse as 40 mesh are produced, the majority of the particles are 60 mesh and finer. A percentage of the overall throughput is finer than 200 mesh. Another advantage for a wet grind process is the cleanliness and consistency of the crumb rubber produced. The process washes the crumb rubber particles. The wet process removes the fine particles of fiber from the crumb rubber making a very clean product.

The initial granulate contains steel, rubber, and textile components. The steel is typically recovered using a multi-stage magnetic separation process to minimize the loss of rubber. This can entail a first step utilizing a high strength twin pole overband cross belt separator magnet to remove metal containing particles in a first step. The second step involves a magnetic drum separator or magnetic pulley utilizing high strength rare earth magnets. The axial magnetic field causes the metal containing particles to tumble and release entrapped rubber. For fine rubber material that is fed into a powder grinder, a plate magnet suspended close to the product over the conveyor can lift and remove fine wire fragments. Testing can be conducted to determine metal content, e.g., by using a magnetometer.

The fiber can be recovered using modified gin machinery as known in the textile industry. A two step process is typically employed, where clean fiber is removed from EOL tire crumb using a modified gin cylinder cleaner (used in the textile industry to remove foreign matter from seed cotton). Partially cleaned crumb is subjected to a second step to remove fiber, which can still contain some rubber particles. The resulting cleaned EOL tire crumb is then collected for packaging or other use. See, e.g., W. Stanley Anthony, Applied Engineering in Agriculture, Vol. 22(4): 563-570.

American Society for Testing and Materials (ASTM) has standards for specifying different size ranges of crumb rubber, such as 30 mesh or 80 mesh. The range of particle sizes can be determined by sieve analysis, consisting of shaking and tapping a measured quantity of a crumb rubber sample through a specified number of test sieves over a specified time. The amount of sample retained on each screen is weighed and results are given as the percentage of sample retained on each screen. The recommended procedure for sieve analysis using the Rotap method is provided in ASTM 5644. Typical crumb rubber sizes directed to certain products and uses include the following: molded and extruded products, 4-100 mesh; asphalt modification, 16-40 mesh; sport surfacing, ¼"-40 mesh; automotive products, 10-40 mesh; tires, 80-100 mesh; rubber and plastic blends, 10-40 mesh; and construction, 10-40 mesh.

There are no unified U.S. standards for processing EOL tire rubber crumb; however, a suitable EOL tire rubber crumb for use in interlinked substitution typically has a low fiber content (less than 0.02% of total weight), low metal content (less than 0.01% of total weight), high consistency, and the particles are preferably sized for 100% pass through 16 mesh. In some embodiments, it may be acceptable to have particles of larger size, e.g., 14, 12, or even 10 mesh. For example, 10-40 mesh crumb rubber (e.g., 30 mesh, or 25-35 mesh) yields satisfactory results when processed according to the methods described herein. Smaller particles, e.g., 41-200 mesh, can be employed and may enable more efficient interlinked substitution; however, a reduction in particle size will incur greater expense in manufacture of the crumb of the specified size. Larger particles, e.g., less than 10 mesh (4-9 mesh) can also be subjected to the methods, e.g., for particle size reduction purposes.

ASTM D5603 Standard Classification for Rubber Compounding Materials—Recycled Vulcanizate Particulate, classifies vulcanized particulate rubber according to maximum particle size, size distribution and parent materials including whole tires, tire peels, buffings generated from the tire tread and shoulder, buffings generated from tire tread, shoulder and sidewall and non-tire rubber.

End-of-Life Tire Crumb Characterization ELT crumb containing vulcanized rubber and having the desired particle sizes can be manufactured or obtained from any suitable commercial source.

The ELT crumb is typically of such a size that 100% can pass through a 16 mesh screen, and may have a narrow size distribution (e.g., no smaller than 20 mesh and no larger than 16 mesh) or may have a broader size distribution (e.g., significant contents of fines and various other particle sizes less than 16 mesh). The crumb rubber is typically cleaned of fiber and wire to a purity of 99.5 wt. % (i.e., 0.5 wt. % or less of fiber and wire).

If the sulfur content of the ELT crumb is unknown, representative samples of the ELT crumb can be tested to determine sulfur content (typically measured in parts per hundred weight), such that a controlled amount of reactant can be used in the extraction process, thereby avoiding overutilization or underutilization of reactant. A stoichiometric amount of reactant to sulfur is typically employed; however, larger or smaller amounts can also be advantageously employed. Any suitable method can be employed to determine the sulfur compound; however, a nitric compound extraction process can be advantageously employed. ASTM D4578 describes standard test methods to apply to rubber chemicals for determination of percent sulfur. These test methods cover the determination of solvent insoluble materials in a sulfur-containing sample. The two test methods are: (1) Test Method A, Extraction by Carbon Disulfide, and (2) Test Method B, Extraction by Toluene. If there are no other solvent insoluble materials present in the sulfur-containing sample, the test methods determine the insoluble sulfur content directly. If other materials are also present, additional testing is necessary to identify what portion of the insolubles (e.g., carbon black, silica, or other inert fillers) is insoluble sulfur.

Sulfur Crosslinking of Rubber

Elemental sulfur has cyclic eight atoms molecules at room temperature. In the presence of accelerators and activators, elemental sulfur generates sulfur fragments that react with reactive groups of rubbers in the process of interlinked substitution to create crosslinks such as:

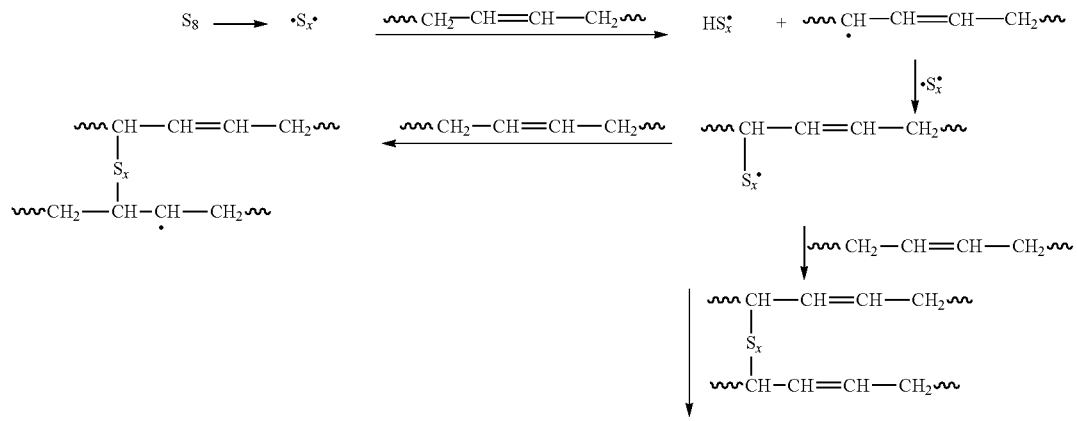

EOL tire rubber crumb is subjected to a chemical treatment with a reactant to induce interlinked substitution. The reactant comprises a metal salt having octahedral molecular geometry and a melting point in the range of 100-150° C. Examples of suitable reactants include cobalt acetate (CAS 6147-53-1; $Co(OAc)_2$) and copper acetate (CAS 6046-93-1; $Cu(OAc)_2$), although other reactants can be employed, as discussed elsewhere herein. The reactant is typically employed at from 0.1 to 5.0 parts reactant per hundred parts vulcanized rubber (by weight); however, higher or lower amounts may also be employed in certain embodiments. The amount of reactant employed can be increased or decreased depending upon the content of sulfur in the EOL tire rubber crumb to be treated, or the desired degree of interlinked substitution to be obtained. For example, a ratio of reactant molecules to sulfur bonds of 1:1, 4:6, 1:2, or any other suitable ratio can be employed to achieve a preselected degree of interlinked substitution.

Producing a Recycled Rubber-Based Elastomer

Crumb rubber particles as are conventionally obtained from recycled EOL tires can advantageously be employed in the methods of the embodiments. These particles are typically 30 mesh in size. The crumb rubber particles contribute carbon black and/or graphene as a component of the resulting polymeric matrix. It is generally preferred that the resulting polymeric matrix comprise at least 60% by weight of tire rubber-derived polymer; however, in certain embodiments less tire rubber-derived polymer can be employed. When 90% tire rubber is employed, a system superior to conventional black master batch is obtained. A mixture containing from 80-90% by weight tire rubber with the remainder virgin polymer can be considered a suitable substitute for black master batch. In certain embodiments, only tire rubber (no virgin polymer) is employed with satisfactory results.

An organometallic compound is employed as a reactive component (variously referred to herein as "organometallic compound", "OMC", "reactive component", or "reactant") to dislocate attachment points in the crumb rubber polymer. The organometallic compound comprises a metal having octahedral molecular geometry. As an example, the organometallic compound can be provided in a form of a metal salt that undergoes a phase change from solid to liquid in a range of 115-150° C., e.g., copper acetate. The reactant is typically employed at from 0.1 to 5.0 parts reactant per hundred parts vulcanized rubber (by weight); however, higher or lower amounts may also be employed in certain embodiments. The use of a pulsed or oscillating magnetic field as described herein enables lower amounts of reactant (organometallic compound) to be employed, e.g., from 0.1 to 0.5 parts organometallic compound per hundred parts vulcanized rubber (by weight). While not wishing to be bound by any theory, it is believed that in the reaction, metal acetate ion dissociative substitution occurs at the methyl carbocation. This disrupts the vulcanization precursor, and the insertion forms a new functional site at the elastomer pendent structure for subsequent sulfidic bridge realignment. In the process, $O^{2-}$ is converted to $CO_2$ with a phase space particle charged carbon aggregate. Strong interactions between $M^{2+}$ and $S^{2-}$ form a precipitate, which liberates a rigid sulfidic bridge to a 'tether' state, bound only at the original allylic carbocation. Various metal ions are suitable for use, including but not limited to $Co^{2+}$ (ligand exchange rate for an $H_2O$ metal coordination matrix of $3 \times 10^6$), $Cu^{2+}$ (ligand exchange rate for an $H_2O$ metal coordination matrix of $5 \times 10^9$), $Ni^{2+}$ (ligand exchange rate for an $H_2O$ metal coordination matrix of $3 \times 10^4$), $Zn^{2+}$ (ligand exchange rate for an $H_2O$ metal coordination matrix of $2 \times 10^7$), and $Mn^{2+}$ (ligand exchange rate for an $H_2O$ metal coordination matrix of $2 \times 10^7$). Substantial data exists in literature that a copper based organometallic molecule can manifest up to a coordination number of ten (10) in a heated, water environment. This coordination capacity provides for the intermediate formation of a super-floppy matrix to assist the process by capturing a ligand from the inhibiting isomer 'debris' near the methyl carbocation reactive site. The ligand capture and release rates are many times faster than other metals as well. These impressive capabilities lead to the possibility that a variety of copper based, reaction isomers may be created from the heterogeneous maw of molecules present during the GTRP unpacking-metathesis sequence. By selecting an organometallic compound that exhibits a phase change at a temperature close to that of elemental sulfur, it may be possible to facilitate the metathesis reaction; however, organometallic compounds having different phase change temperatures can also be employed. The metal can be provided in ionic form with an organic anion, e.g., acetate. Copper acetate is suitable for use as an organometallic compound in the methods of the embodiment.

In the present method, a pulsed or oscillated magnetic field is employed to induce a temporary magnetic state into the organometallic compound, which is paramagnetic. This pulsed magnetic field induces rapid and thorough dispersion of the organometallic compound into the ground tire rubber particles. This rapid and thorough dispersion of organometallic compound into the ground tire rubber particles means that fewer passes through the nip roller are required to achieve the same quality of elastomer from the process. For example, instead of the 10 or more passes through the nip required without a pulsed magnetic field, a similar result can be obtained for three passes.

While not wishing to be bound by any theory, it is believed that the pulsed magnetic field causes the organometallic compound to compress. This rapid compression and relaxation as the organometallic compound goes in and out of a phase change drives the organometallic compound into the matrix of the ground tire rubber particle, saturating the particle with the organometallic compound. The organometallic compound is preferably provided in a form of an aqueous mixture, for maximum compression in the magnetic field. When water is introduced into the mixture prior to the pinch roller or in the pinch roller as the magnetic field is generated, a saturation of the organometallic compound in a particle as small as 600 μm can be achieved. The amount of water present and the strength of the magnetic field are controlled so as to avoid dissociation.

A mixture of organometallic compound and ground tire rubber particles is passed through the nip of a pair of pinch rollers. While pinch rollers are advantageously employed in the present embodiments, other apparatus as are known in the art for subjecting a material to pressure can also be employed. The pinch rollers can have a smooth surface (cylindrical), or have interlocking teeth. The pinch rollers can be fabricated from any suitable material, preferably a paramagnetic material (e.g., steel) or diamagnetic material (ceramic). The pinch rollers can incorporate one or more rods capable of generating a pulsed or oscillating magnetic field. The magnetic field can be generated by pulsing direct current (DC) or through the use of an alternating current (AC) through an electromagnet. A pair of electromagnets can cooperatively generate an oscillating field, with each electromagnet alternatively generating a field. Typically from 10-100 pulses per second are generated, however, in certain embodiments fewer or more pulses per second can be employed. In other embodiments, a magnet can be external to the pinch roller. For example, a horseshoe magnet can be placed surrounding one of the pinch rollers.

The pinch rollers can have the same or different diameters, e.g., one roller can be 10%, 20%, 30%, 40%, 50%, 60%, 70%, 80%, 90%, or 100% or more larger in diameter than the other. The pinch roller can have any suitable diameter, e.g., 1 cm or less to 100 cm or more, e.g., 10 cm, 20 cm, 30 cm, 40 cm, 50 cm, 60 cm, 70 cm, 80 cm, 90 cm, or 100 cm. The rollers can have the same or different revolutions per minute, e.g., one roller can have an rpm from 1% to 100% or more faster than the other, e.g., 1%, 5%, 10%, 15%, 20%, 25%, 30%, 35%, 40%, 45%, or 50% faster.

Alternatively, the electromagnet can be situated ahead of the pinch roller. In this embodiment, the mixture of organometallic compound and ground tire rubber particles is passed from a mixing unit (e.g., tank or hopper) to the pinch roller, e.g., by a belt. The magnetic field is generated along at least a portion of the belt. In one embodiment, the mixture passes through a tunnel, e.g, from 1 to 10 feet in length, where it is subject to the pulsed magnetic field before entering the pinch rollers. The pulsed magnetic field has a sufficiently strong flux density to induce penetration of the organometallic compound, but not so strong as to cause mixture particles to be pulled off of the belt towards the electromagnet.

Various metal ions are suitable for use as the organometallic compound, including but not limited to $Co^{2+}$ (ligand exchange rate for an $H_2O$ metal coordination matrix of $3\times10^6$), $Cu^{2+}$ (ligand exchange rate for an $H_2O$ metal coordination matrix of $5\times10^9$), $Ni^{2+}$ (ligand exchange rate for an $H_2O$ metal coordination matrix of $3\times10^4$), $Zn^{2+}$ (ligand exchange rate for an $H_2O$ metal coordination matrix of $2\times10^7$), and $Mn^{2+}$ (ligand exchange rate for an $H_2O$ metal coordination matrix of $2\times10^7$). Copper-based organometallic compounds are suitable for use, such as copper acetate.

In certain embodiment, a solution or partial solution (suspension) of the organometallic compound in water or another suitable solvent (e.g., an alcohol such as methanol or ethanol, or an ether or glycerol) or mixture of solvents is provided, which can optionally be heated (e.g., to a temperature above ambient, e.g., from 150° up to the boiling point of the solution or suspension when water is employed) and added to the pre-heated ELT rubber crumb. The amount of water employed to prepare the solution can be selected to provide a particular ratio of solution to ELT rubber crumb. By employing the pulsed magnetic field of the embodiments, less organometallic compound can be utilized to achieve similar results in terms of product elastomer quality. Water suitable for use can include typical municipal water, or distilled or deionized water; however, particulate levels at or below 100 ppm can be preferred in some embodiments. An advantage of employing the reactant in solution or suspension form includes efficiencies and greater ease of handling the resulting activated ELT crumb rubber, which can be in a flowable state or more processable state when worked in the pinch roller. While not wishing to be bound by any particular theory, it is believed that a solution of the reactant assists in wetting the shoreline of the ELT rubber crumb particles, thereby placing more reactant in contact with the surface of the ELT rubber crumb particles than is the case for dry reactant particles. Mechanical working by the pinch rollers then acts to break up air pockets, further coating the ELT rubber crumb particles. At a reactor pressure of 80 to 100 psi, a steam phase is generated from the solution that gives a more uniform reaction than when dry reactant particles are employed. This enables reactor run times when a reactant solution is employed to be reduced by 50% or more compared to that for dry reactant particles, with the same degree of interlinked substitution achieved. By utilizing the pulsed magnetic field, even more efficiency is achieved in saturating the rubber particles with organometallic compound, enabling less to be employed to achieve the same product quality, and enabling less mechanical working to be employed to achieve the same product quality.

The activated ELT rubber crumb (e.g., an admixture of crumb rubber, reactant, and optional additional components) in certain embodiments can be transferred to a reactor, e.g., a roller mill or a horizontal compression reactor. The reactor can be operated at ambient temperatures or temperatures up to 250° F. or higher, e.g., at a temperature of from 242° F. to 248° F. (or a higher or lower temperature, in certain embodiments, e.g., 225° F. to 265° F., or 235° F. to 255° F., or 240° F. to 250° F.), where it is kneaded or masticated to a gum-like state. Sampling of the kneaded product can optionally be conducted at intervals to determine particle size (e.g., effective particle size as represented by film thickness), wherein the particle size is believed to be indicative of the degree of sulfidic metathesis. Additional reactant can be titrated into the kneaded product until a desired particle size target is reached.

A target particle size can be obtained by controlling the degree of sulfidic metathesis, e.g., by controlling the reactor processing time (shorter for larger particle sizes, and longer for smaller particle sizes), or by the amount of reactant added to the ELT rubber crumb. In the absence of a pulsed magnetic field, at 5% by weight reactant to 95% by weight ELT rubber crumb, an excess of reactant is present for the amount of sulfur bonds present in typical ELT rubber crumb. A stoichiometric amount of reactant can be employed when maximizing sulfidic metathesis. High degrees of interlinked substitution, e.g., >90% interlinked substitution, are typically observed when a mixture of 4 wt. % reactant to 96% ELT rubber crumb is employed. A mixture of 3 wt. % reactant to 97% ELT rubber crumb will leave a significant amount of sulfur bonds present. In certain embodiments without a pulsed magnetic field, a certain degree of the original vulcanization is maintained (e.g., approximately half, or one quarter, of the sulfur bonds remain intact) so as to impart desirable properties to the resulting product (e.g., tenacity, elasticity, etc.) when employed in certain applications (e.g., black masterbatch for producing rubberized asphalt or specialty rubber products). In these applications, a mixture of 2 wt. % reactant to 98% ELT rubber crumb can employed. The resulting interlinked substituted rubber material exhibits good tenacity while having a particle size of <1 µm and can be blended homogeneously into a black masterbatch without impacting critical properties. The present method utilizing a pulsed magnetic field enables the amount of reactant (organometallic compound) to be dropped below 2 wt. % without sacrificing product quality, e.g., as low as 1.5 wt. %, 1 wt. %, or 0.5 wt. % or even more, enabling the process to be conducted in a more cost effective manner.

As a final step in the process when a reactant solution is employed, the product subject to sulfidic metathesis can optionally be subjected to a dehydration step by heating at or below 250° F. It is believed that the presence of micronized water in the activated ELT rubber crumb may inhibit metathesis of the sulfur bonds. Further heating at temperatures of 285° F. may remove this micronized water and achieve some further amount of sulfidic metathesis. Alternatively, a product containing some degree of water in it may be a desired end product, e.g., for processing at temperatures of 250° F. to 290° F.

An oscillating magnetic field having very long, low energy, near the DC wavelength, offers advantages. A pulsed field wavelength in the range of 300 MHz to 300 GHz, e.g., 500 MHz to 30 GHz, e.g., 700 MHz to 3 GHz, e.g., 800 MHz to 1 GHz, e.g., 900 MHz (e.g., in the industrial microwave spectrum) accomplishes both "stirring" (e.g., dispersion of the organometallic compound into the ground tire rubber particles) and "heating" (e.g., heating at or below 250° F. to dehydrate, or further heating at higher temperatures from 250° F. up to 300° F., e.g., 285° F., to remove micronized water). The creation of a higher temperature due to the presence of water alone can speed reaction rate kinetics, but the pulsed wavelength helps maintain a selectivity for the metathesis to move forward without prematurely dissociating the OMC morphology.

Once the desired particle size target is reached, the kneaded or masticated product can optionally be treated with an agent that neutralizes any unreacted reactant. Any suitable neutralizing agent can be employed; however, it is typically preferred to employ a terminally hydroxylated polyethylene (e.g., polyethyleneglycol, CAS 25322-68-3) or a polyethylene copolymer with hydroxyallyl side chain functionality, or derivative thereof. The neutralizing agent is typically used at 0.05 to 0.1 parts neutralizing agent per hundred parts rubber (by weight); however, higher or lower amounts may also be employed in certain embodiments. Other post treatment processes can also be conducted, including any other processes that virgin rubber is subjected to, e.g., grafting to incorporate other polymeric chains to yield a thermoset, thermotrope or thermoplastic product.

The interlinked substitution process of the embodiments offers advantages for reclamation of rubber. For example, no outgassing or pH change is observed during the process or in the interlinked substituted product, which was in the form of sub-micron sized particles, indicating that a stable interlinked substituted product was obtained that is capable of vulcanization. The process offers advantages in that it does not utilize or generate any dangerous or hazardous chemicals, and in that no exogenous substances are generated that would significantly impact the usefulness of the resulting product in applications where virgin rubber is typically employed. Depending upon the application, a higher or lower degree of interlinked substitution may be desirable. For example, in uses such as outdoor carpet backing, roads and roofs, a lower degree of interlinked substitution (partial interlinked substitution) may yield an acceptable product, whereas for uses in high performance articles such as auto tires, a product having a higher degree of interlinked substitution may be desirable. The methods of the embodiments can be adapted to produce product that is partially interlinked substituted, up to highly interlinked substituted and similar in performance to virgin rubber.

The elastomer produced by the methods of the embodiments is suitable for use in fabricating tires as the sole rubber source, or it can be used in combination with base black master batch at loadings above 3%, e.g., 4, 5, 6, 7, 8, 9, 10, 15, 20, 25, 30, 35, 40, 45, 50, 55, 60, 65, 70, 75, 80, 85, 90, or 95 wt. % or more.

The elastomer is near elemental sulfur-free, having a morphology similar to composite virgin rubber, to be ≤50 micron in particle size, with substantial retention of the carbon black. The elastomer is suitable for use as at least 20% and up to 50%, 60%, 70%, 80%, 90%, or more (e.g., as much as 100% by weight) of the sidewall of new, light truck and auto tires. Such an elastomer is also suitable for use in membranes and industrial rubber goods.

In one embodiment, the product of the method described herein is a composite material derived from a low temperature electromagnetic reactor process wherein an organometallic catalyst is uniformly suffused throughout a ca 600 micron, ground tire rubber (GTR), crosslinked thermoset powder at a 0.5:99.5 ratio (by weight). The GTR is harvested from end of life (EOL) scrap tires utilizing conventional tire grinding equipment at ambient temperatures. The yield from this PTR process is a thermoplastic material which exhibits a three orders of magnitude leap in surface-to-volume ratio (SAVR) with average particle size in the 500-800 nm range; without loss of initial interpenetrating elastomer-to-filler, composite structural integrity. This material may be prepared for further process compounding as a tack-free; sheet, roll or pellet format.

Bound rubber is the rubber portion of a filler-rubber compound that has strong interactions with the filler surface and cannot be extracted by a good solvent of the polymer.

Styrene Butadiene Rubber and/or Natural Rubber (SBR, NR) are the principal elastomers used to build tires. Final tire performance criteria of; distortion control, heat management, wet and dry traction quality, wear rate and rolling resistance are achieved, first and foremost, by filling the SBR-NR elastomer blend with up to 80% phr, nanometer clusters of carbon black and/or silica aggregate. Optimal, final tire performance requires dispersement and surface adsorption of the filler-rubber surface interface which exceeds, ca 25% NR and 40% SBR bound rubber, respectively. EOL-GTR, with bound rubber in this range, regenerated into PTR will characteristically provide 45% NR and 70% SBR bound rubber.

Sulfidic crosslink bridges created during the vulcanization process of the original tire generally fall in the range of three to seven sulfur atoms in length, with varying levels of pendulus sulfur rings. This sulfur bridge is formed between elastomer strands during vulcanization beginning (~140 C) at a methyl carbocation then proceeding to a primary carbocation (~160 C). The PTR process selectively dislocates the methyl carbocation without destroying the sulfidic bridge. This releases the original tire composite morphology to be processed into various future applications under thermoplastic conditions. The dislocated site may then be re-crosslinked at the desired moment with the appropriate catalysts and vulcanization schedule.

Bound rubber is a measure of filler surface activity to the interpenetrating elastomer matrix. At proper loading within new tire construction, PTR's improved bound rubber ratio(s) will improve new filler-elastomer dispersement, lower process viscosities, lower overall total filler requirements, save energy by speeding up processing, reduce tire weight and yield improved final tire performance criteria in all categories. In particular it is expected that rolling resistance will be positively impacted; as a higher bound rubber ratio with smaller particle size will augment the reinforcing effect with overall improved dispersement and lower dynamic hysteresis.

Whether it be a virgin, black master batch with carbon black distributed and dispersed according to industry standard(s) for manufacturing passenger or truck pneumatic tires, which is then ground to a 30 mesh size (with or without) being vulcanized, or EOL tires ground to 30 mesh, the following bonded rubber enhancement can be achieved using any combination of the listed process methods, including rubber prepared by a conventional process (e.g., extruder or Banbury mixture) or PTR rubber prepared utilizing an organometallic compound. With respect to the PTR rubber mentioned above, the process by which it is prepared involves subjecting ground tire rubber with dislocated sulfidic bridge to high pressure rolls or mixing extruder using: 1) thermal control(s) to hold reaction in phase change box to maximize (additional) domain boundary mixing and embedment not achieved during original compounding and/or 2) electrophoretic migration of colloidal nature of filler particles under influence of strong, pulsing/switching magnetic field to further de-agglomerate and/or disperse during high pressure excursion.

TABLE 3

Carbon Black Filler (at 60 phr)

|  | Avg. Bonded Rubber % (conventional) | Avg. Bonded Rubber (PTR) |
|---|---|---|
| Styrene Butadiene Rubber (SBR) | 35-40% | 65-70% |
| Natural Rubber (NR) | 20-25% | 35-40% |

The carbon black is in 15-75 nm clusters. Also present is silica (at 25-40 phr) in 10-50 nm clusters. The small particle rolled into a thin sheet takes on an anisotropic 'grain' into which cavitation can be induced as that thin sheet is processed into a high pressure nip, typically between two counter rotating rolls of the same diameter but usually operating at different rpm (e.g., 1.25:1.00). These more precise process control combination(s) cannot effectively be employed with conventional equipment.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A method for preparing a recycled rubber-based elastomer, comprising:
    applying compression to a mixture comprising vulcanized rubber particles and an organometallic compound, where the mixture subject to compression is exposed to a pulsed magnetic field, whereby a recycled rubber-based elastomer is obtained.

2. The method of claim 1, wherein the pulsed magnetic field has a wavelength in a range of from 300 MHz to 300 GHz, optionally from 500 MHz to 30 GHz, optionally from 700 MHz to 3 GHz, optionally from 800 MHz to 1 GHz, and optionally 900 MHz.

3. The method of claim 1, wherein the mixture is subject to compression in pinch rollers while being exposed to the pulsed magnetic field.

4. The method of claim 3, wherein the mixture passes between the pinch rollers from 3 to 100 times.

5. The method of claim 3, wherein the mixture passes between the pinch rollers from 3 to 10 times.

6. The method of claim 3, wherein the mixture passes between the pinch rollers from 3 to 5 times.

7. The method of claim 1, wherein the organometallic compound comprises a metal having octahedral molecular geometry, optionally a metal ion selected from the group consisting of $Co^{2+}$, $Cu^{2+}$, $Ni^{2+}$, $Zn^{2+}$, and $Mn^{2+}$.

8. The method of claim 1, wherein the organometallic compound comprises an organic anion as a ligand to a metal ion, optionally wherein the organic anion comprises acetate ion.

9. The method of claim 1, wherein the organometallic compound is copper acetate.

10. The method of claim 1, wherein the organometallic compound is a metal salt that undergoes a phase change from solid to liquid or vapor in a range of 100-150° C.

11. The method of claim 1, wherein the vulcanized rubber particles have a particle size greater than 200 mesh.

12. The method of claim 1, wherein the organometallic compound is employed at a concentration of from 0.1% to 3% by weight of the mixture.

13. The method of claim 1, wherein the organometallic compound is employed at a concentration of from 0.1% to 2% by weight of the mixture.

14. The method of claim 1, wherein the organometallic compound is employed at a concentration of from 0.1% to 0.5% by weight of the mixture.

15. The method of claim 1, wherein the organometallic compound is employed at a concentration of 0.5% by weight of the mixture.

16. The method of claim 1, wherein the organometallic compound is employed in aqueous form.

17. The method of claim 1, wherein the organometallic compound is employed in a form of an aqueous mixture, wherein the aqueous mixture has a concentration of organometallic compound of from 5.5 to 7.5% by weight.

18. The method of claim 1, wherein the organometallic compound is employed in a form of an aqueous mixture, wherein the aqueous mixture has a concentration of organometallic compound of 6.5% by weight.

19. The method of claim 1, wherein the organometallic compound is dry coated on the vulcanized rubber particles.

20. The method of claim 1, wherein the mixture is subjected to a pressure of 10,000 psi to 30,000 psi.

21. The method of claim 1, wherein the mixture is exposed to 10 to 1000 magnetic pulses per second.

22. The method of claim 1, wherein the mixture is exposed to 10 to 100 magnetic pulses per second.

* * * * *